United States Patent
Obara et al.

(10) Patent No.: US 10,637,543 B2
(45) Date of Patent: Apr. 28, 2020

(54) BASE STATION

(71) Applicant: NTT DOCOMO, INC., Tokyo (JP)

(72) Inventors: Tatsunori Obara, Tokyo (JP); Satoshi Suyama, Tokyo (JP); Tatsuki Okuyama, Tokyo (JP); Yukihiko Okumura, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/082,647

(22) PCT Filed: Mar. 8, 2017

(86) PCT No.: PCT/JP2017/009305
§ 371 (c)(1),
(2) Date: Sep. 6, 2018

(87) PCT Pub. No.: WO2017/154996
PCT Pub. Date: Sep. 14, 2017

(65) Prior Publication Data
US 2019/0074874 A1 Mar. 7, 2019

(30) Foreign Application Priority Data
Mar. 11, 2016 (JP) .................................. 2016-048752

(51) Int. Cl.
*H04B 7/0452* (2017.01)
*H04W 16/28* (2009.01)
(Continued)

(52) U.S. Cl.
CPC ......... *H04B 7/0452* (2013.01); *H04B 7/0426* (2013.01); *H04B 7/0617* (2013.01);
(Continued)

(58) Field of Classification Search
CPC .. H04B 7/0452; H04B 7/0626; H04B 7/0617; H04B 7/0426; H04W 88/08; H04W 16/28; H04W 28/18; H04W 72/08
See application file for complete search history.

(56) References Cited

U.S. PATENT DOCUMENTS

| | | | |
|---|---|---|---|
| 2008/0026797 A1* | 1/2008 | Nanda | H01Q 1/246 455/562.1 |
| 2008/0165877 A1* | 7/2008 | Guo | H04B 7/043 375/262 |

(Continued)

FOREIGN PATENT DOCUMENTS

| | | | |
|---|---|---|---|
| JP | 2009-177616 A | 8/2009 |
| JP | 2010-004517 A | 1/2010 |

(Continued)

OTHER PUBLICATIONS

Notice of Reasons for Refusal issued in counterpart Japanese Patent Application No. 2016-048752, dated Jun. 25, 2019 (9 Pages).

(Continued)

*Primary Examiner* — Afshawn M Towfighi
(74) *Attorney, Agent, or Firm* — Osha Liang LLP

(57) ABSTRACT

There is provided a base station that supports multi-user MIMO and performs communication with a plurality of mobile stations of a radio communication system including the base station and the plurality of mobile stations, the base station including a determination unit that determines a number of a plurality of streams to be transmitted to each of the plurality of mobile stations and parameters to be applied to each of the plurality of streams to be transmitted to each of the plurality of mobile stations based on a channel estimation value for each of the plurality of mobile stations, and a transmitter that generates a determined number of streams according to the parameters determined by the (Continued)

BASE STATION OF RELATED ART

MASSIVE MIMO BASE STATION determination unit to be transmitted to the respective plurality of mobile stations.

5 Claims, 13 Drawing Sheets

(51) Int. Cl.
*H04W 88/08* (2009.01)
*H04B 7/0426* (2017.01)
*H04W 72/08* (2009.01)
*H04B 7/06* (2006.01)
*H04W 28/18* (2009.01)

(52) U.S. Cl.
CPC .......... *H04B 7/0626* (2013.01); *H04W 16/28* (2013.01); *H04W 72/08* (2013.01); *H04W 88/08* (2013.01); *H04W 28/18* (2013.01)

(56) References Cited

U.S. PATENT DOCUMENTS

| | | | |
|---|---|---|---|
| 2009/0034637 A1* | 2/2009 | Hoshino | H04B 7/0417 375/260 |
| 2010/0291917 A1* | 11/2010 | Wang | H04B 7/0617 455/422.1 |
| 2014/0241177 A1* | 8/2014 | Wang | H04W 24/02 370/252 |
| 2014/0334566 A1* | 11/2014 | Kim | H04B 7/0469 375/267 |
| 2015/0282122 A1* | 10/2015 | Kim | H04L 25/03898 370/329 |
| 2017/0156067 A1* | 6/2017 | Huang | H04W 16/28 |

FOREIGN PATENT DOCUMENTS

| | | |
|---|---|---|
| JP | 2015-126271 A | 7/2015 |
| WO | 2006/098379 A1 | 9/2006 |

OTHER PUBLICATIONS

International Search Report issued in PCT/JP2017/009305 dated Jun. 6, 2017 (5 pages).
Written Opinion of the International Searching Authority issued in PCT/JP2017/009305 dated Jun. 6, 2017 (4 pages).
"Docomo 5G white paper", Sep. 2014, NTT Docomo, Internet URL: https://www.nttdocomo.co.jp/corporate/technology/whitepaper_5g/ (27 pages).

* cited by examiner

BASE STATION OF RELATED ART

MASSIVE MIMO BASE STATION

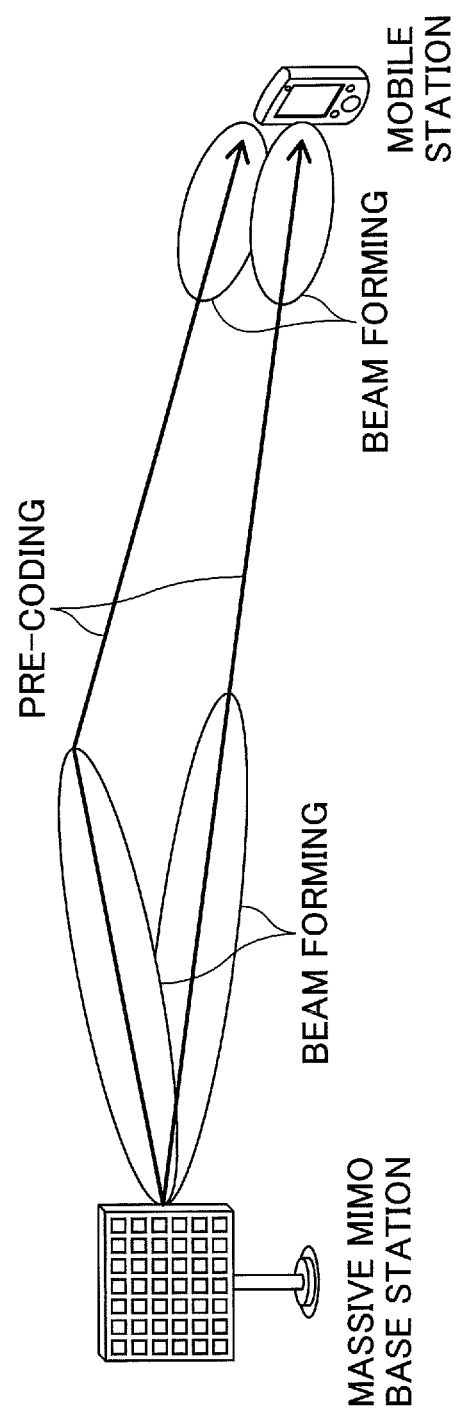

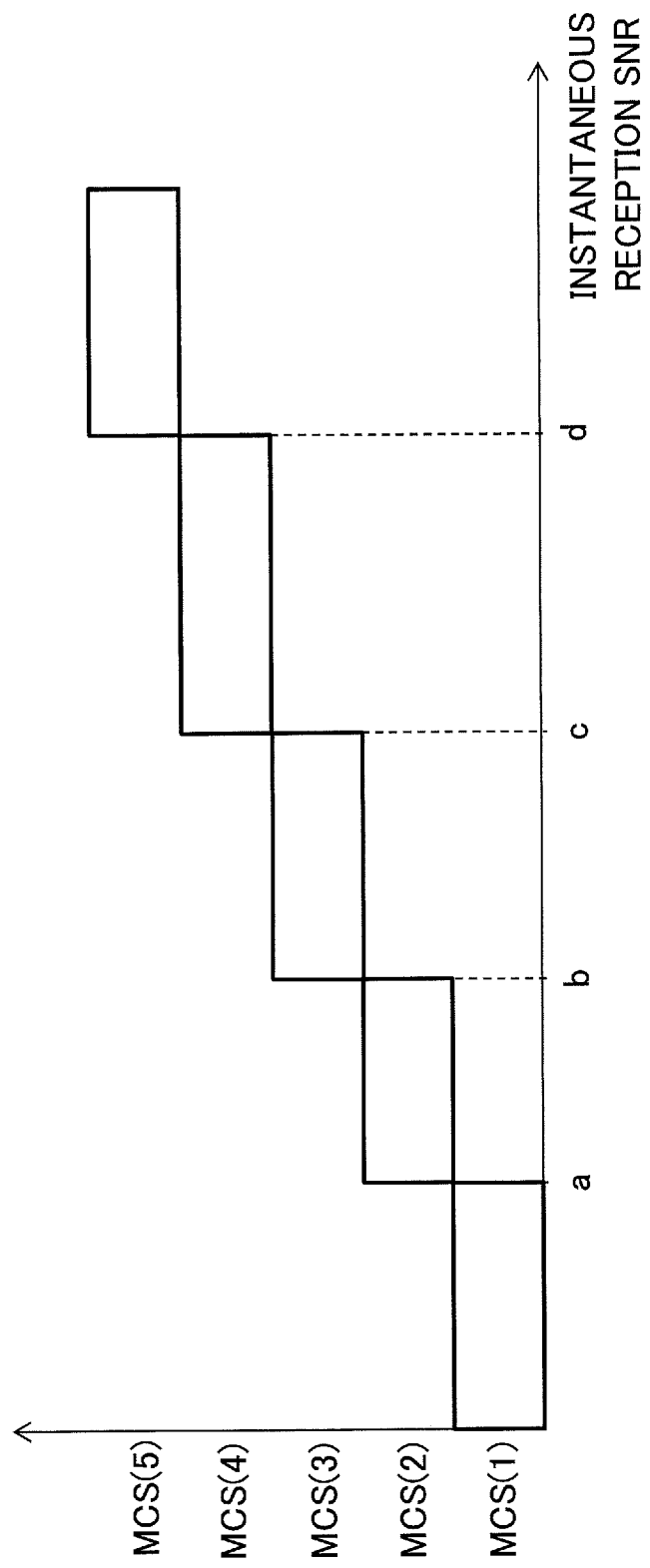

FIG.11B

| MCS | INSTANTANEOUS RECEPTION SNR | MODULATION LEVEL | CODE RATE |
|---|---|---|---|
| MCS(1) | ~a | QPSK | 1/2 |
| MCS(2) | a~b | 16QAM | 1/2 |
| MCS(3) | b~c | 16QAM | 2/3 |
| MCS(4) | c~d | 64QAM | 1/2 |
| MCS(5) | d~ | 64QAM | 2/3 |

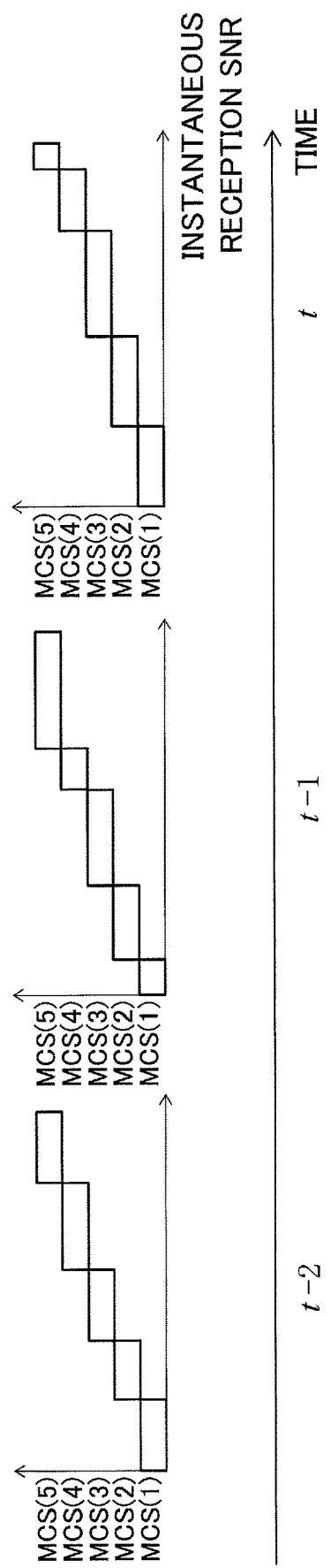

BASE STATION

TECHNICAL FIELD

The present invention relates to a base station.

BACKGROUND ART

In Long Term Evolution (LTE), in order to further increase a system capacity, further increase data a transmission rate, and further reduce latency in a radio section, a radio communication scheme called 5G has been studied. In 5G, various element techniques have been studied in order to satisfy requirements that latency in a radio section be less than or equal to 1 ms while achieving throughput of greater than or equal to 10 Gbps.

In 5G, a higher frequency band than that of LTE is assumed to be used. Here, since a propagation loss increases in a high frequency band, to compensate for it, it has been studied to apply massive Multi Input Multi Output (MIMO), in which beam forming with a narrow beam width is performed. Massive MIMO is a large-scale MIMO in which a plurality of antenna elements (for example, 100 elements) are installed at a base station side, and it is possible to reduce interference between users since it is possible to concentrate an electric field strength in a narrow region.

FIG. 1A illustrates an example of beam forming performed by a base station according to a related art such as LTE, and FIG. 1B illustrates an example of beam forming performed by a base station using massive MIMO. As illustrated in FIG. 1B, it is possible to transmit radio signals far away through beam forming with a narrow beam width. In massive MIMO, high speed communication can be achieved by performing spatial multiplexing while highly controlling a plurality of beams between a base station and a mobile station. FIG. 2 illustrates an example where two beams are spatially multiplexed while performing beam forming in both a base station and a mobile station.

PRIOR ART DOCUMENT

Non-Patent Document

Non-Patent Document 1: NTT DoCoMo, Inc. "Docomo 5G White Paper," September 2014

SUMMARY OF THE INVENTION

Problem to be Solved by the Invention

MIMO includes single-user MIMO (SU-MIMO) in which a plurality of streams are multiplexed to one mobile station as illustrated in FIG. 3A and multi-user MIMO (MU-MIMO) in which a plurality of streams are distributed and multiplexed to a plurality of mobile stations as illustrated in FIG. 3B. In SU-MIMO, a spatial correlation is high because receiving antennas are arranged to be concentrated in one mobile station. In contrast, in MU-MIMO, a spatial correlation is lower than in SU-MIMO because receiving antennas are arranged to be distributed to a plurality of mobile stations. Therefore, in MU-MIMO, a capacity (throughput) of the whole radio communication system can be improved to be higher than that of SU-MIMO. Further, in MU-MIMO, since a plurality of mobile stations simultaneously perform communication, it is necessary to perform a pre-coding process in order to reduce interference that may occur between mobile stations in addition to interference that may occur between a plurality of streams.

When communication is performed according to MU-MIMO, it is necessary for a base station to select various kinds of resources used for communication (the number of ranks, a modulation level, a code rate, and the like). Further, when various kinds of resources are selected, it is desirable that the base station select resources so that throughput of the entire radio communication system (total throughput between the base station and all the mobile stations) is increased whenever possible.

The disclosed technology has been developed in light of the foregoing, and an object is to provide a technique that allows resources used for communication to be adaptively selected in a radio communication system using MU-MIMO.

Means for Solving Problem

A base station according to the disclosed technology is a base station that supports multi-user MIMO and performs communication with a plurality of mobile stations of a radio communication system including the base station and the plurality of mobile stations, the base station including a determination unit that determines a number of a plurality of streams to be transmitted to each of the plurality of mobile stations and parameters to be applied to each of the plurality of streams to be transmitted to each of the plurality of mobile stations based on a channel estimation value for each of the plurality of mobile stations; and a transmitter that generates a determined number of streams according to the parameters determined by the determination unit to be transmitted to the respective plurality of mobile stations.

Advantage of the Invention

According to the disclosed technology, a technique is provided that allows resources used for communication to be adaptively selected in a radio communication system using MU-MIMO is provided.

BRIEF DESCRIPTION OF DRAWINGS

FIG. 2 is a diagram illustrating an example in which communication is performed using two beams;

FIG. 11A is a diagram visually illustrating a look-up table;

FIG. 11B is a diagram illustrating an example of the look-up table; and

FIG. 12 is a diagram illustrating an example of an updated look-up table.

EMBODIMENTS OF THE INVENTION

Hereinafter, an exemplary embodiment of the present invention is described with reference to the appended drawings. An embodiment to be described below is merely an example, and an embodiment to which the present invention is applied is not limited to the following embodiment. For example, a radio communication system according to the present embodiment is assumed to be a system of a scheme conforming to LTE or 5G, but the present invention is not limited to LTE or 5G but can be applied to other schemes.

<System Configuration>

Figure 1A:
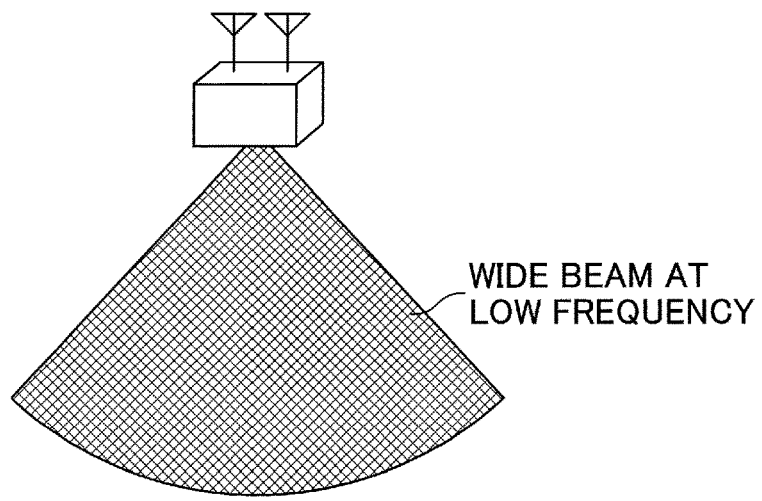
FIG. 1A is a diagram illustrating an example of beam forming.
Figure 1B:
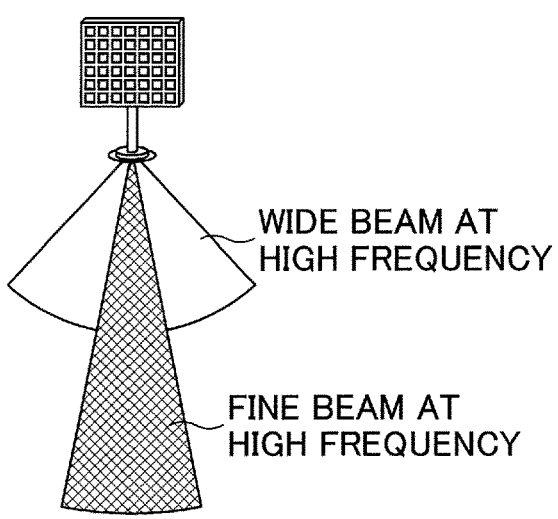
FIG. 1B is a diagram illustrating an example of beamforming performed by a base station using MassiveMIMO.
Figure 3A:
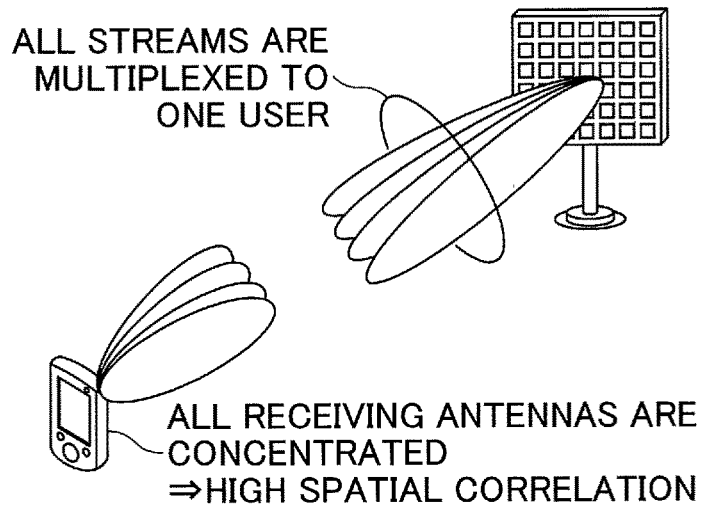
FIG. 3A is a diagram illustrating an example of SU-MIMO.
Figure 3B:
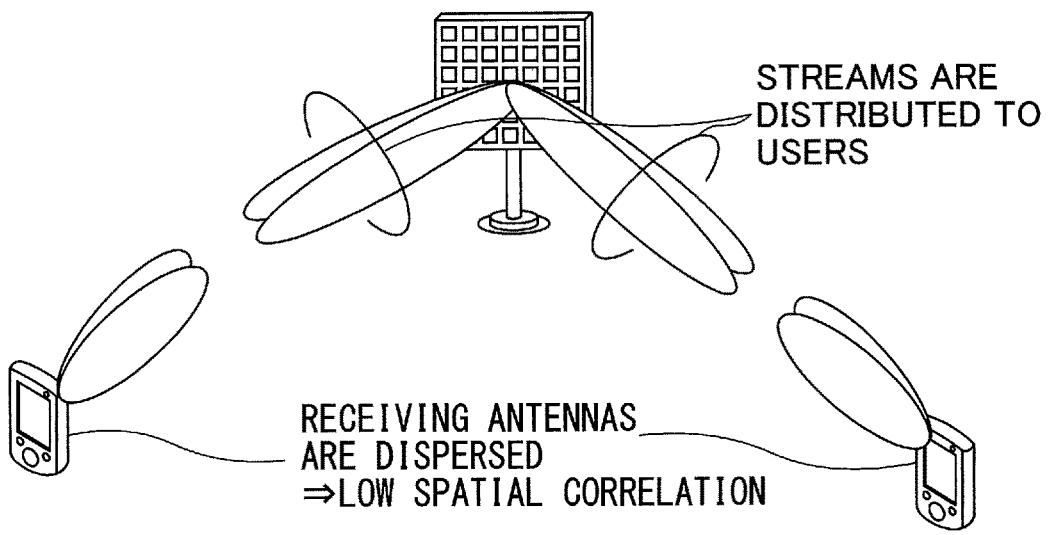
FIG. 3B is a diagram illustrating an example of MU-MIMO.
Figure 4:
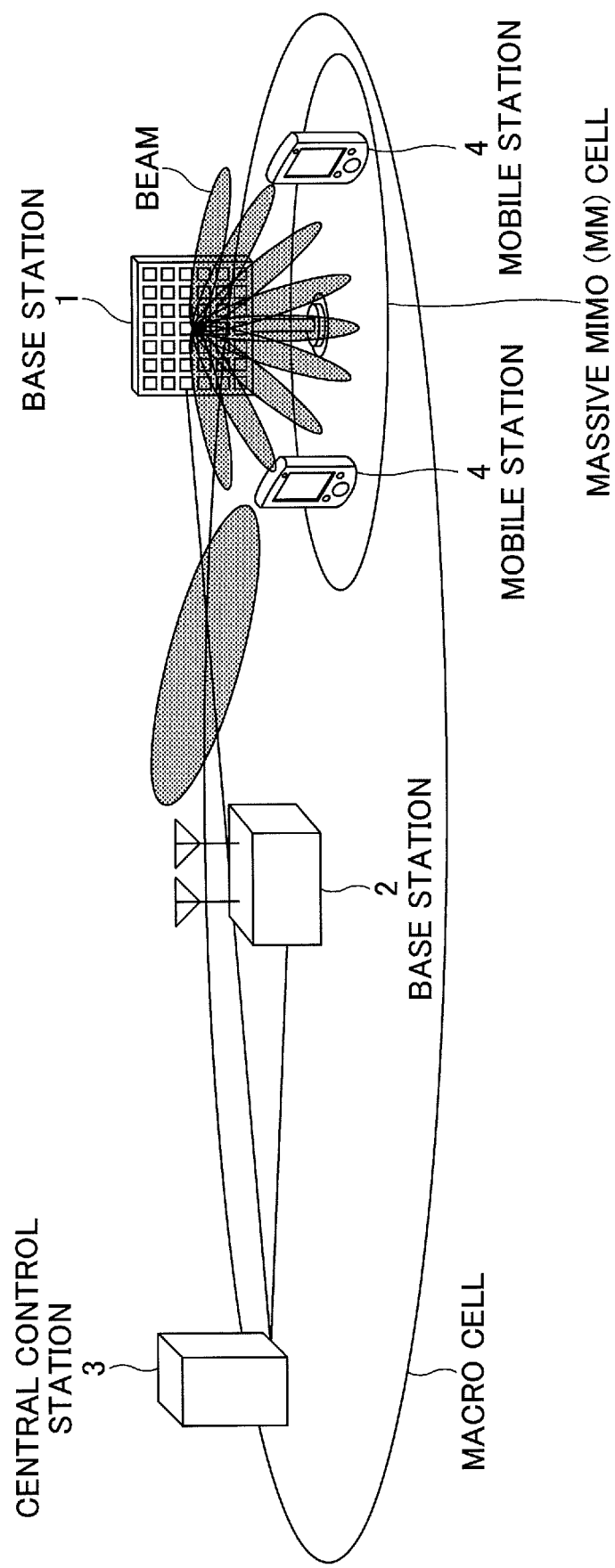
FIG. 4 is a diagram illustrating an exemplary configuration of a radio communication system according to an embodiment.

FIG. 4 is a diagram illustrating an exemplary configuration of a radio communication system according to an embodiment. The radio communication system according to the embodiment includes a base station 1 supporting massive MIMO, a base station 2 forming a macro cell, a central control station 3, and a mobile station 4. The base station 1 includes a plurality of antenna elements and forms a massive MIMO cell (an MM cell). The MM cell indicates a cell formed by a plurality of beams transmitted from the base station 1. In the MM cell, for example, it is possible to realize higher speed communication than in a macro cell, for example, using a band having a bandwidth of 100 MHz or higher at 5G Hz or higher.

The base station 2 forms a macro cell with a larger coverage than the MM cell. The macro cell is assumed to be a cell of LTE (including LTE-advanced (LTE-A), but the macro cell is not limited thereto and may be a cell using a radio technique other than LTE such as a wireless LAN. In other words, in the present embodiment, cells of LTE or, cells of the wireless LAN, or the like are arranged to overlap the MM cell.

The central control station 3 has a function of concentratedly controlling the base station 1 and the base station 2. For example, the central control station 3 performs scheduling of radio resources possessed by the base station 1 and base station 2, control of a higher layer (for example, a RRC layer or the like), and the like.

The mobile station 4 has a function of communicating with the base station 1 or the base station 2. Two mobile stations 4 are illustrated in FIG. 4, but three or more mobile stations 4 may be provided in the present embodiment. The mobile station 4 may have a function of communicating with either of the base station 1 and the base station 2 or may have a function (multiple connectivity) of simultaneously performing communication with the base station 1 and the base station 2.

<Operation Overview>

In the present embodiment, when downlink communication according to MU-MIMO is performed, the base station 1 adaptively selects (distributes) a downlink rank number and various kinds of parameters to be applied to each stream (a modulation level, a code rate, and a power distribution coefficient) based on a channel estimation value between the base station 1 and a plurality of mobile stations 4 ($N_u$ mobile station 4), and performs communication.

Figure 5:
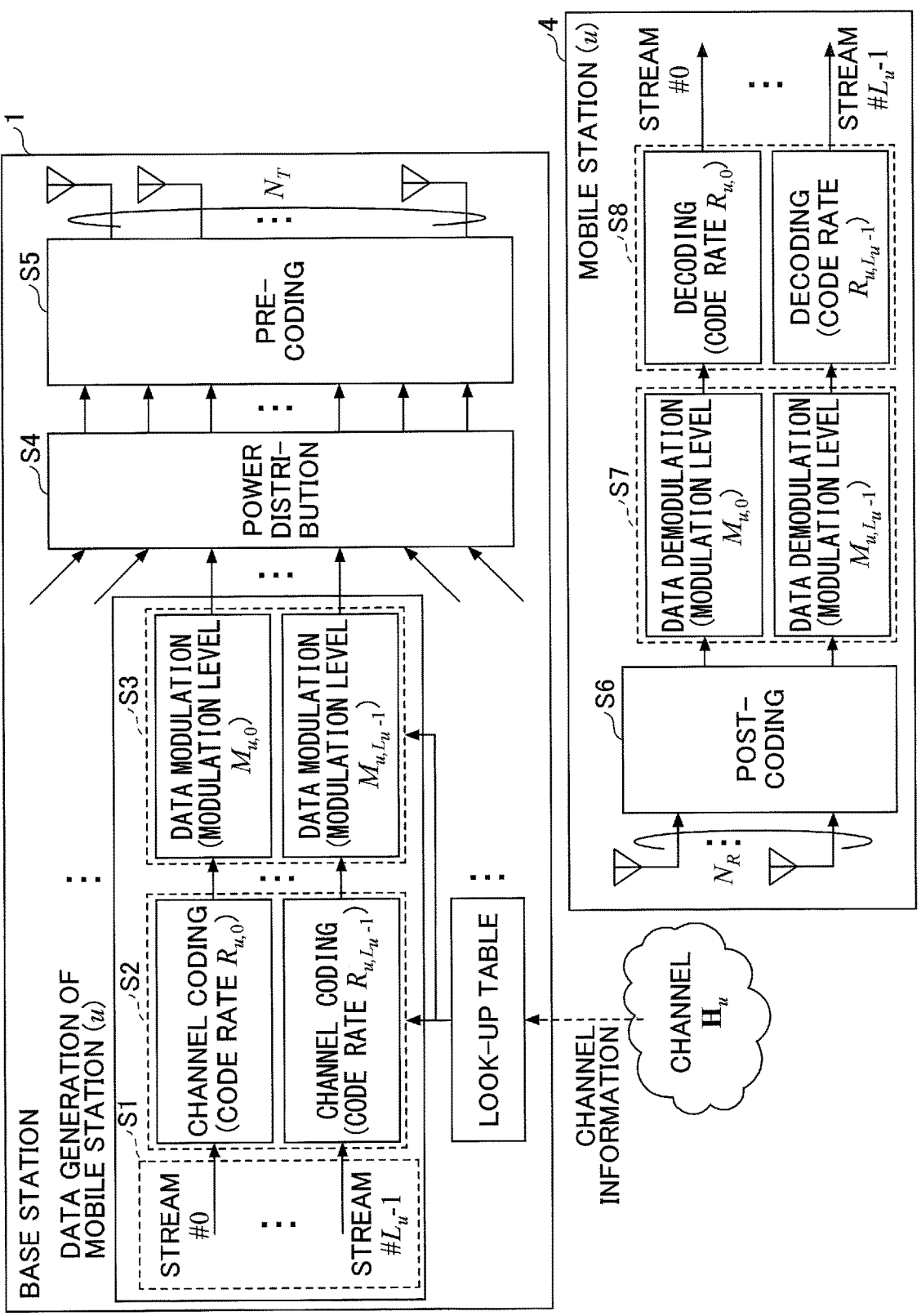
FIG. 5 is a diagram for describing an overview of a processing procedure performed between a base station and a mobile station supporting massive MIMO.

FIG. 5 is a diagram for describing an overview of a processing procedure performed between a base station and a mobile station supporting massive MIMO. In the present embodiment, the number of mobile stations 4 with which the base station 1 is assumed to communicate at the same time is determined by a scheduling process in advance. In an example of FIG. 5, a processing procedure in which downlink communication is performed with one mobile station 4 (hereinafter, referred to as a "mobile station (u) 4") among a plurality of mobile stations 4 is mainly illustrated, but the processing procedure illustrated in FIG. 5 is performed in parallel with each of a plurality of mobile stations 4.

The base station 1 determines the number of streams ($L_u$) used for downlink communication destined for the mobile station (u) 4, and generates a plurality of streams (#0 to #$L_u$-1) (S1). Then, the base station 1 performs channel coding on each of a plurality of streams with a code rate ($R_{u,0}$ to $R_{u,Lu-1}$) applied to the mobile station (u) 4 (S2). Then, the base station 1 modulates encoded data with a modulation level ($M_{u,0}$ to $M_{u,Lu-1}$) applied to the mobile station (u) 4 (S3).

Then, the base station 1 distributes total transmission power that can be used for transmission by the base station 1 to respective streams according to power distribution coefficients (ratios to the total transmission power) of all the streams to be transmitted to a plurality of mobile stations 4 (S4), and performs pre-coding using a pre-coding matrix determined by a predetermined method (S5). A radio signal that has undergone the pre-coding is transmitted from each antenna ($N_T$).

Then, the mobile station (u) 4 separates a radio signal received through a receiving antenna ($N_R$) into a plurality of streams by performing a post-coding process on the received radio signal the using a post-coding matrix (S6). Then, the mobile station (u) 4 demodulates each stream with the same modulation level ($M_{u,0}$ to $M_{u,Lu-1}$) as the modulation level used for modulation of the signal destined for the mobile station (u) 4 by the base station 1 (S7). Then, the mobile station (u) 4 decodes the demodulated stream with the same code rate ($R_{u,0}$ to $R_{u,Lu-1}$) as the code rate used for encoding the signal destined for the mobile station (u) 4 by the base station 1 (S8). In the processing procedure of steps S7 and S8, a notification of the number of ranks (the same meaning as the number of streams ($L_u$)), the modulation level, and the code rate is given from the base station 1 to the mobile station (u) 4 through, for example, control information.

<Functional Configuration>

(Base Station)

Figure 6:
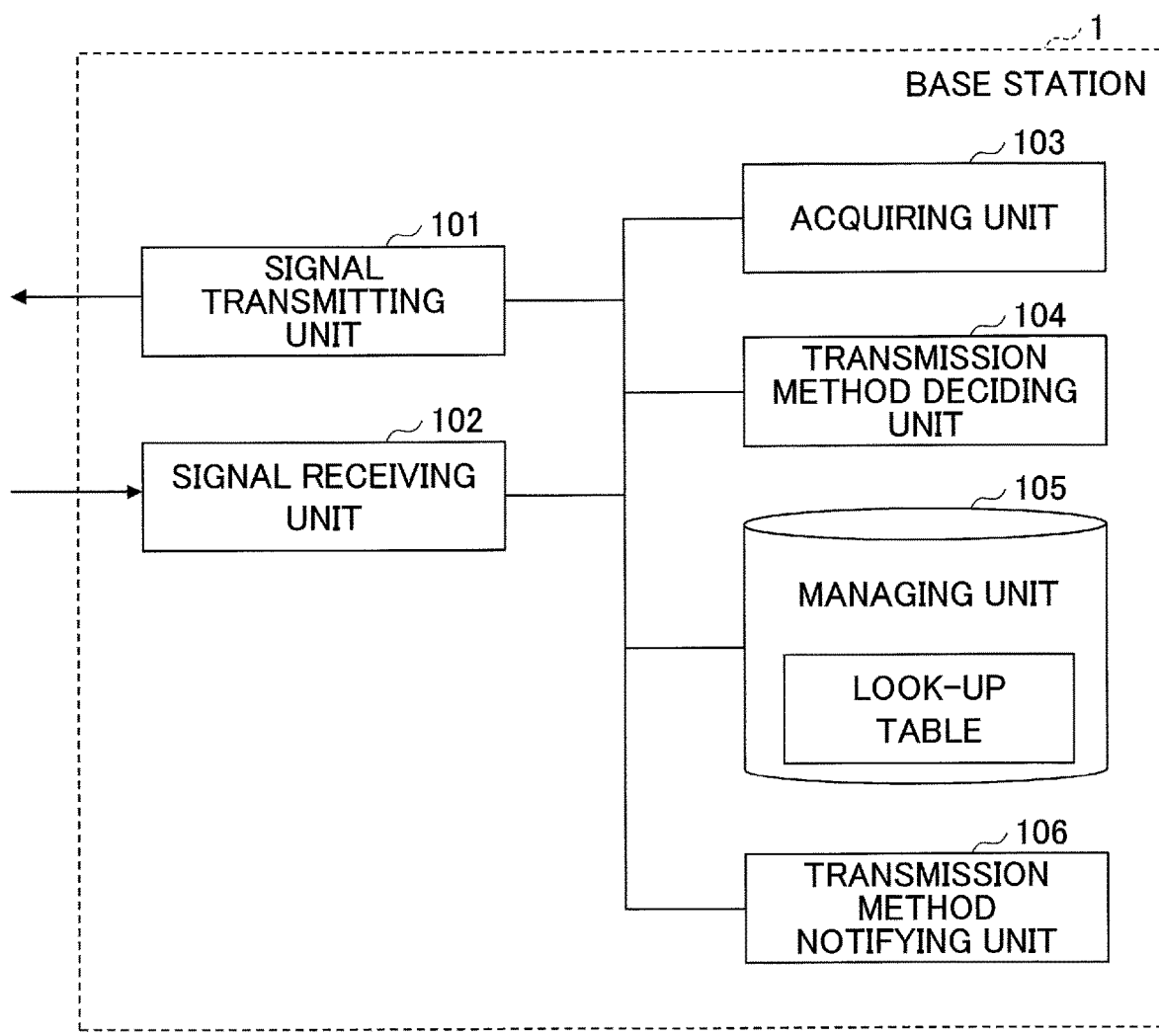
FIG. 6 is a diagram illustrating an exemplary functional configuration of a base station according to an embodiment.

FIG. 6 is a diagram illustrating an exemplary functional configuration of the base station according to an embodiment. As illustrated in FIG. 6, the base station 1 includes a signal transmitting unit 101, a signal receiving unit 102, an acquiring unit 103, a transmission method determination unit 104, a managing unit 105, and a transmission method notifying unit 106. FIG. 6 illustrates only main function units in the present embodiment, and functions (not illustrated) of performing operations conforming to a communication scheme used in the present radio communication system are also provided.

The signal transmitting unit 101 has a function of generating various kinds of signals of a physical layer from signals of a higher layer and wirelessly transmitting the signals. Further, the signal transmitting unit 101 includes a function of performing the processing procedure described in steps S1 to S5 illustrated in FIG. 5 and a function of transmitting downlink signals to a plurality of mobile stations 4 according to parameters determined by the transmission method determination unit 104. The signal receiving unit 102 has a function of acquiring a signal of the higher layer from a signal of the physical layer received from the mobile station 4.

The acquiring unit 103 has a function of acquiring channel information between antennas between the base station 1 and the mobile station 4. Further, the acquiring unit 103 has a function of storing the acquired channel information in a memory or the like. Furthermore, the acquiring unit 103 has a function of acquiring (receiving) noise power reported from the mobile station 4.

The transmission method determination unit 104 has a function of determining the number of a plurality of streams to be transmitted to a plurality of mobile stations and parameters to be applied to a plurality of streams to be transmitted to a plurality of mobile stations based on the channel estimation value with a plurality of mobile stations 4. The parameters indicate a code rate, a modulation level, and a power distribution coefficient to be applied to each of a plurality of streams used for downlink signals transmitted to a plurality of mobile stations 4.

The transmission method notifying unit 106 has a function of notifying the mobile station 4 of the number of ranks (the same meaning as the number of streams) determined by the transmission method determination unit 104 and the modulation level and the code rate to be applied to a plurality of streams through the signal transmitting unit 101.

The managing unit 105 has a function of managing a table in which a reception SNR is associated with the modulation level and the code rate corresponding to the reception SNR (hereinafter, referred to as a "look-up table"). A specific example of the look-up table is described below. The managing unit 105 further has a function of generating and updating the table.

(Mobile Station)

Figure 7:
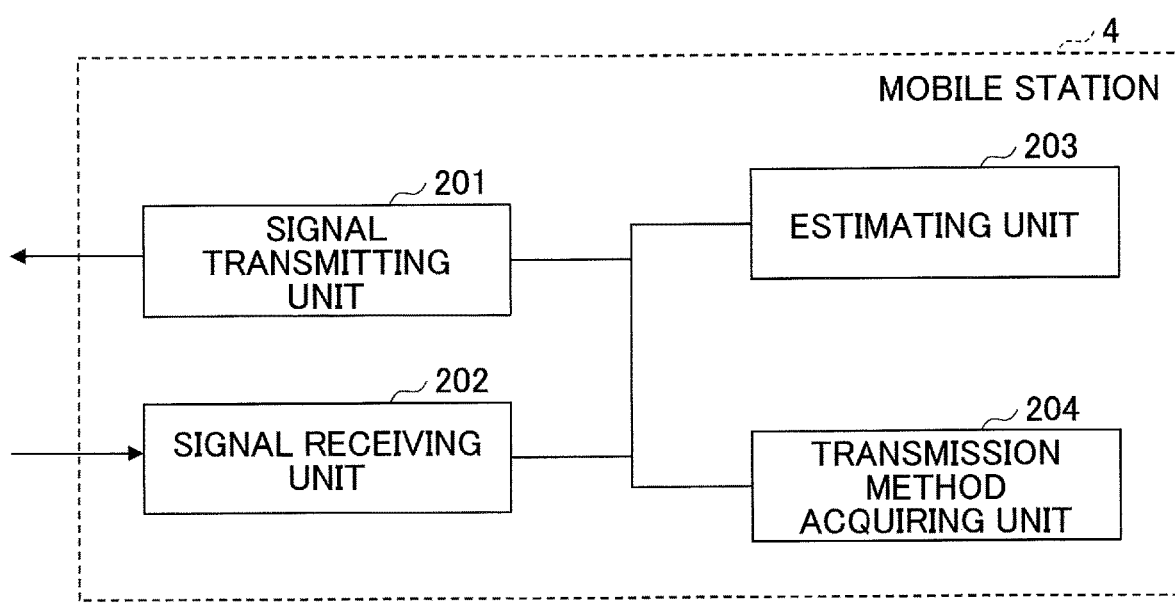
FIG. 7 illustrates an exemplary functional configuration of a mobile station according to an embodiment.

FIG. 7 is a diagram illustrating an exemplary functional configuration of the mobile station according to an embodiment. As illustrated in FIG. 7, the mobile station 4 includes a signal transmitting unit 201, a signal receiving unit 202, an estimating unit 203, and a transmission method acquiring unit 204. FIG. 7 illustrates only main function units in the present embodiment, and functions (not illustrated) of performing operations conforming to a communication scheme used in the present radio communication system are also provided.

The signal transmitting unit 201 has a function of generating various kinds of signals of the physical layer from signals of the higher layer and wirelessly transmitting the signals. Further, the signal transmitting unit 201 has a function of transmitting an uplink reference signal. The signal receiving unit 202 has a function of acquiring a signal of the higher layer from a signal of the physical layer received from the base station 1. The signal receiving unit 202 further has a function of demodulating and decoding signals received from the base station 1 according to the number of ranks, the modulation level, and the code rate reported from the transmission method acquiring unit 204.

The estimating unit 203 has a function of estimating downlink channel information and noise power. The estimating unit 203 further has a function of feeding the downlink channel information back to the base station 1 through the signal transmitting unit 201. The estimating unit 203 may feed the channel information back to the base station 1 only when a duplex scheme used in the present radio communication system is FDD. In the case of time division duplex (TDD), since channel reciprocity is established, it is possible to perform the downlink channel estimation using the uplink reference signal at the base station 1 side.

The transmission method acquiring unit 204 has a function of acquiring (receiving) the number of ranks of the signal transmitted from the base station 1 to itself and the modulation level and the code rate to applied to a plurality of streams from the base station 1 and notifying the signal receiving unit 202 of the number of ranks, the modulation level, and the code rate.

<Hardware Configuration>

(Base Station)

Figure 8:
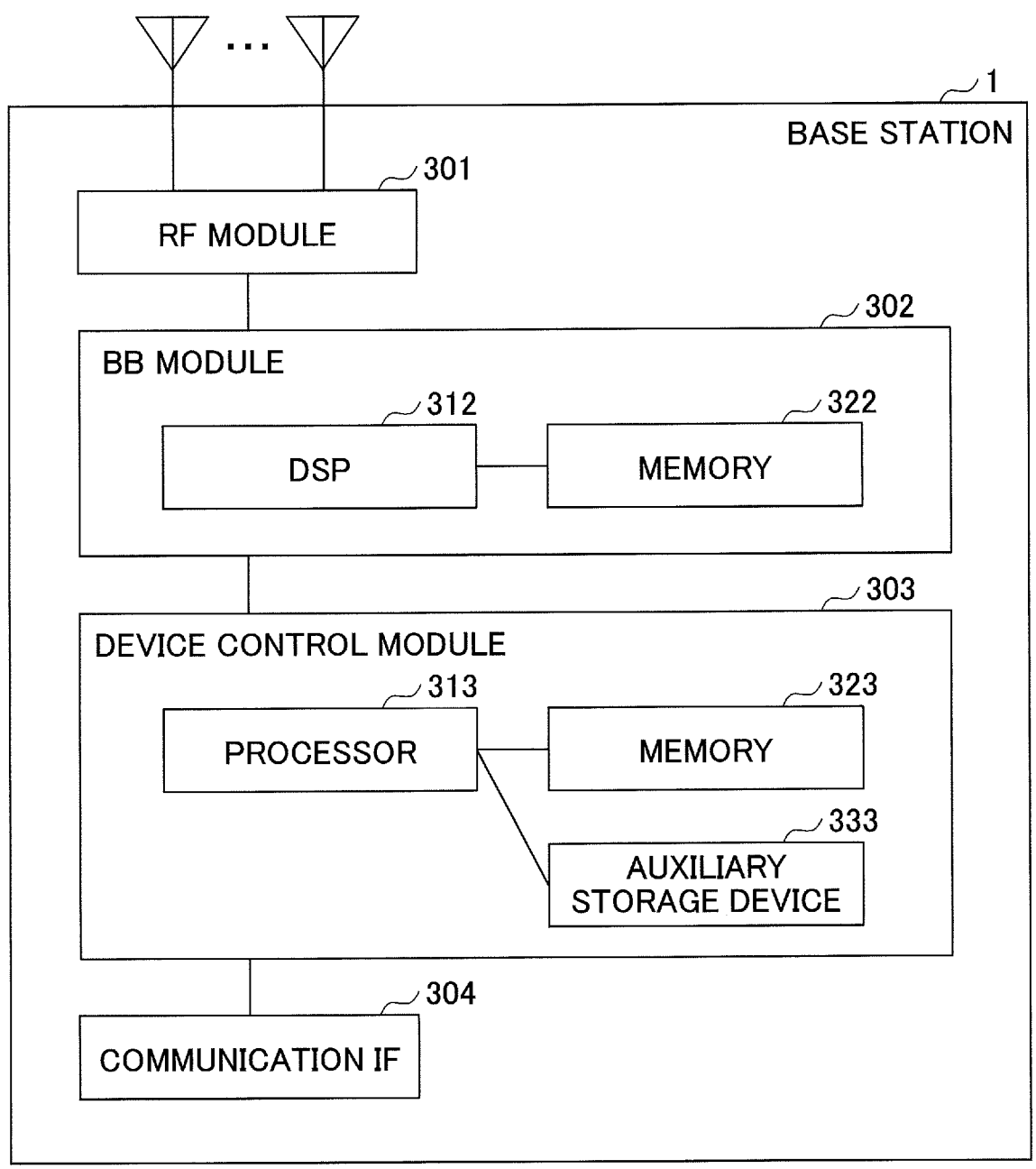
FIG. 8 is a diagram illustrating an exemplary hardware configuration of a base station according to an embodiment.

FIG. 8 is a diagram illustrating an exemplary hardware configuration of the base station according to an embodiment. FIG. 8 illustrates a configuration that is closer to an implementation example than that of FIG. 6. As illustrated in FIG. 8, the base station 1 includes a Radio Frequency (RF) module 301 that performing processing related to a radio signal, a Base Band (BB) processing module 302 that performs baseband signal processing, a device control module 303 that performs processing of the higher layer and the like, and a communication IF 304 that perform communication with other base stations or the like.

The RF module 301 performs digital-to-analog (D/A) conversion, modulation, frequency transform, power amplification, and the like on a digital baseband signal received from the BB processing module 302 and generates a radio signal to be transmitted through an antenna. Further, the RF module 301 performs frequency transform, analog to digital (A/D) conversion, demodulation, and the like on a received radio signal, generates a digital baseband signal, and transfers the digital baseband signal to the BB processing module 302. The RF module 301 includes, for example, a part of the signal transmitting unit 101 and a part of the signal receiving unit 102 illustrated in FIG. 6.

The BB processing module 302 performs a process of converting an IP packet into a digital baseband signal and vice versa. A digital signal processor (DSP) 312 is a processor that performs signal processing in the BB processing module 302. A memory 322 is used as a work area of the DSP 312. The BB processing module 302 includes, for example, a part of the signal transmitting unit 101, a part of the signal receiving unit 102, the acquiring unit 103, the transmission method determination unit 104, the managing unit 105, and the transmission method notifying unit 106 illustrated in FIG. 6.

The device control module 303 performs protocol processing of the IP layer and the like. A processor 313 is a processor that performs processing performed by the device control module 303. A memory 323 is used as a work area of the processor 313. The device control module 303 may include, for example, the managing unit 105 and the transmission method notifying unit 106 illustrated in FIG. 6.

(Mobile Station)

Figure 9:
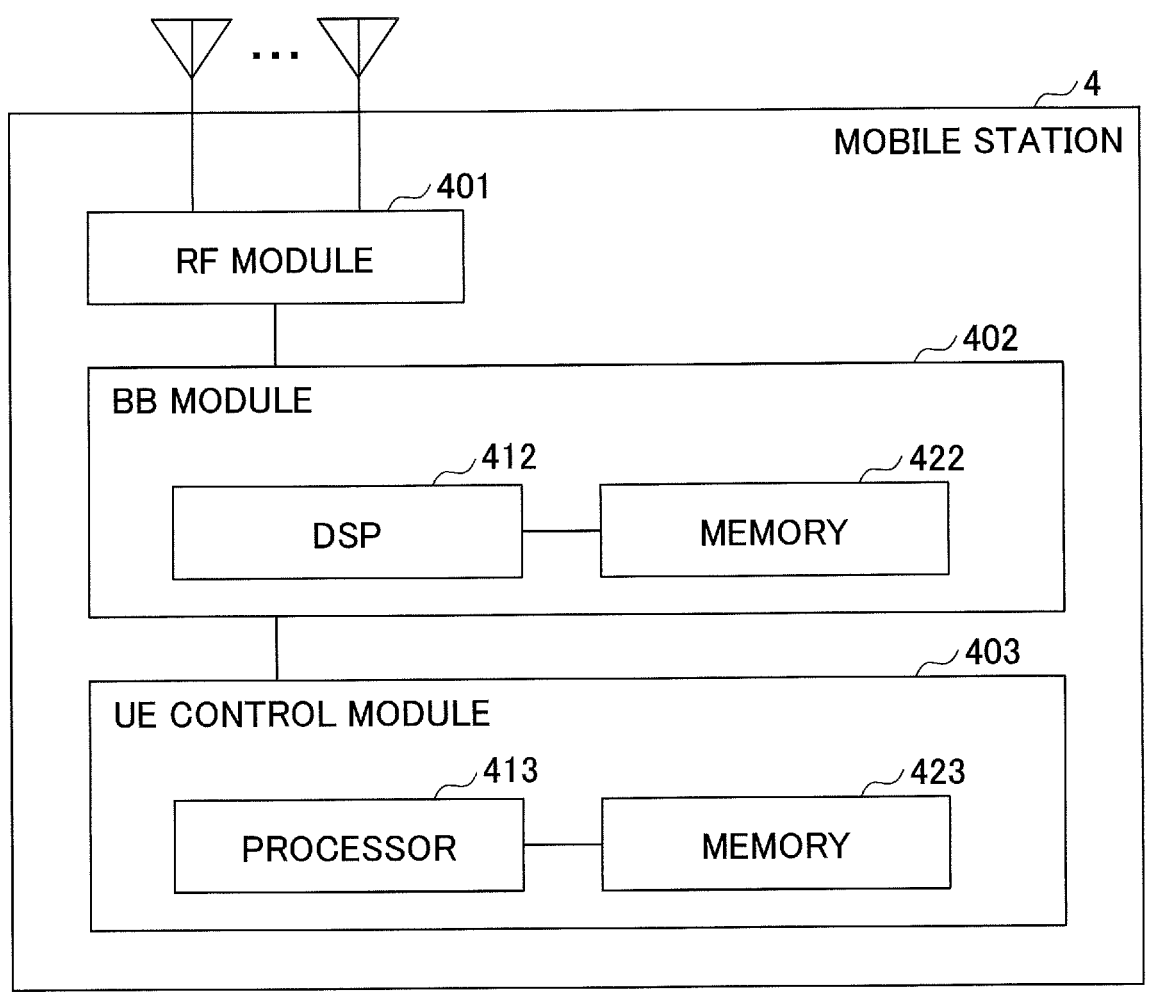
FIG. 9 is a diagram illustrating an exemplary hardware configuration of a mobile station according to an embodiment.

FIG. 9 is a diagram illustrating an example of a hardware configuration of the mobile station according to the embodiment. FIG. 9 illustrates a configuration that is closer to an implementation example than that of FIG. 7. As illustrated in FIG. 9, the mobile station 4 includes an RF module 401 that performs processing relating to radio signals, a BB processing module 402 that performs baseband signal processing, and a UE control module 403 that performs processing of the higher layer and the like.

The RF module 401 performs D/A conversion, modulation, frequency transform, power amplification, and the like on a digital baseband signal received from the BB processing module 402 and generates a radio signal to be transmitted through an antenna. Further, the RF module 401 performs frequency transform, A/D conversion, demodulation, and the like on a received radio signal, generates a digital baseband signal, and transfers the digital baseband signal to the BB processing module 402. The RF module 401 includes, for example, a part of the signal transmitting unit 201 and a part of the signal receiving unit 202 illustrated in FIG. 7.

The BB processing module 402 performs a process of converting an IP packet into a digital baseband signal and vice versa. A DSP 412 is a processor that performs signal processing in the BB processing module 402. A memory 422 is used as a work area of the DSP 412. The BB processing module 402 includes, for example, a part of the signal transmitting unit 201, a part of the signal receiving unit 202, the estimating unit 203, and the transmission method acquiring unit 204 illustrated in FIG. 7.

The UE control module 403 performs protocol processing of the IP layer, processing of various applications, and the like. A processor 413 is a processor that performs the processing performed by the UE control module 403. A memory 423 is used as a work area of the processor 413. The UE control module 403 may include, for example, the transmission method acquiring unit 204 illustrated in FIG. 7.

<Processing Procedure>
(Decision Method of Parameters Used for Communication)

Next, a processing procedure when the base station 1 determines the parameters (the modulation level, the code rate, the number of ranks, and the power distribution coefficient) used for communication on the basis of the channel estimation values between the base station 1 and a plurality of mobile stations 4 are described specifically.

Figure 10:
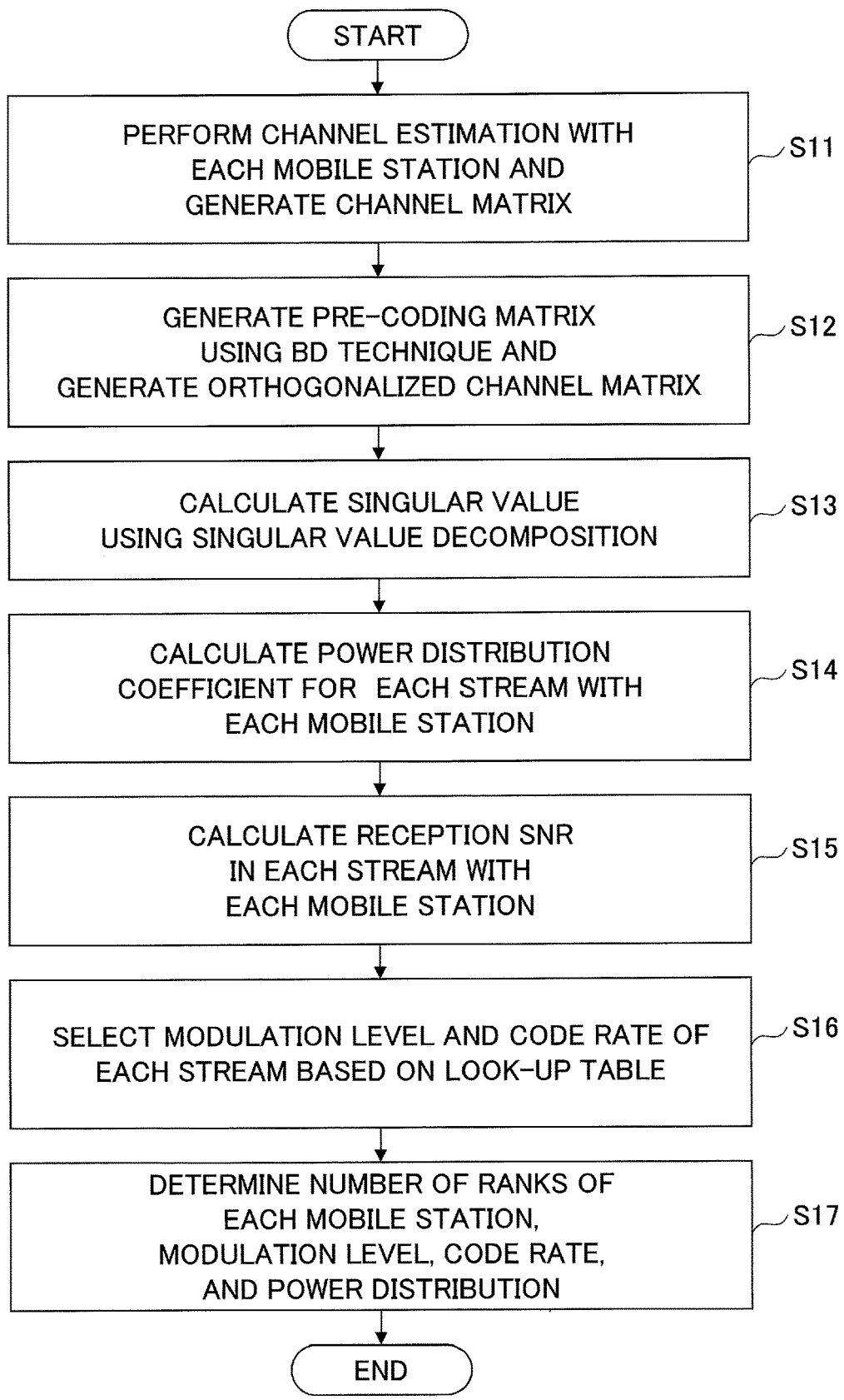
FIG. 10 is a flowchart illustrating an example of a processing procedure performed by a base station according to an embodiment.

FIG. 10 is a flowchart illustrating an example of a processing procedure performed by the base station according to an embodiment. The number of mobile stations 4 that performs communication according to MU-MIMO is assumed to be determined in advance through a scheduling process before the processing procedure illustrated in FIG. 10 is performed.

In step S11, the acquiring unit 103 of the base station 1 acquires a channel matrix ($H_u$) with each of the mobile stations 4. For example, using the reciprocity of Time Division Duplex (TDD), the acquiring unit 103 may acquire the channel matrix ($H_u$) by performing the downlink channel estimation based on the uplink reference signal transmitted from each antenna of each mobile station 4 or may acquire (feedback) the downlink channel information (channel matrix) estimated by the estimating unit 203 of each mobile station 4.

In step S12, the transmission method determination unit 104 generates a pre-coding matrix (P) from the channel matrix ($H_u$) using a block diagonalization (BD) technique illustrated in the following Formula (1), and generates a channel matrix multiplied by the channel matrix ($H_u$) and the pre-coding matrix (P) (referred to as an "orthogonalized channel matrix").

[Math. 1]

$$r = \begin{bmatrix} r_0 \\ r_1 \\ \vdots \\ r_{N_U-1} \end{bmatrix}$$

$$= \begin{bmatrix} H_0 \\ H_1 \\ \vdots \\ H_{N_U-1} \end{bmatrix} P \begin{bmatrix} d_0 \\ d_1 \\ \vdots \\ d_{N_U-1} \end{bmatrix} + z$$

$$= \begin{bmatrix} \tilde{H}_0 & & & \\ & \tilde{H}_1 & & \\ & & \ddots & \\ & & & \tilde{H}_{N_U-1} \end{bmatrix} \begin{bmatrix} d_0 \\ d_1 \\ \vdots \\ d_{N_U-1} \end{bmatrix} + z \quad \text{Formula (1)}$$

$r_0 \sim r_{N_U-1}$ ... Reception signal received by each mobile station
$H_0 \sim H_{N_U-1}$ ... Channel matrix with each mobile station
$P$ ... Pre-coding matrix
$d_0 \sim d_{N_U-1}$ ... Stream transmitted to each mobile station
$z$ ... Noise
$\tilde{H}_0 \sim \tilde{H}_{N_U-1}$ ... orthogonalized channel matrix In step S13, the transmission method determination unit 104 performs singular value decomposition (SVD) on the "orthogonalized channel matrix" in each mobile station 4 using the following Formula (2), and calculate a singular value corresponding to each streams (0 to $K_u$-1) transmitted to each mobile station 4. The singular value decomposition is to obtain a diagonal matrix "$D_u$" using matrices "$U_u$" and "$V_u$." The singular value is also referred to as an "eigenvalue." In the present embodiment, the pre-coding matrix (P) illustrated in Formula (1) and the pre-coding matrix calculated by multiplying the matrix ($V_u$) of each mobile station 4 illustrated in Formula (2) are applied to the pre-coding matrix used in step S5 of FIG. 5.

[Math. 2]

$$\tilde{H}_u = U_u D_u V_u = U_u \text{diag}(\sqrt{\lambda_{u,0}}, \sqrt{\lambda_{u,1}}, \ldots, \sqrt{\lambda_{u,K_u-1}}, 0, \ldots, 0) V_u \quad \text{Formula (2)}$$

$K_u$ ... Rank of mobile station u
$\lambda_{u,0} \sim \lambda_{u,K_u-1}$ ... Singular value of mobile station u In step S14, the transmission method determination unit 104 obtains the power distribution coefficient for each stream ($l_u$: 0 to $K_u$-1) of the mobile station 4 for each mobile station 4. The transmission method determination unit 104 calculates the power distribution coefficients for each stream of each mobile station 4 by applying a water filling principle to the singular values ($\lambda_{u,0}$ to $\lambda_{u,K_u-1}$) corresponding to the streams ($l_u$: 0 to $K_u$-1) of each mobile station 4 calculated by the processing procedure of step S13. The water filling principle is a power distribution technique for maximizing a channel capacity, and high power is distributed to a stream with a large singular value, and low power is distributed to a stream with a small singular value. Further, by using the water filling principle, the optimum number of ranks (the optimum number of streams to be used for communication) is automatically determined as well. In the present embodiment, since it is necessary to distribute the total transmission power to a plurality of mobile stations 4, the power distribution coefficient for each stream may be calculated by applying the water filling principle to the transmission power obtained by equally distributing the total transmission power of the base station 1 by the number of mobile stations 4.

Further, the transmission method determination unit 104 may calculate the power distribution coefficient for each stream of the mobile station 4 by equally distributing the total transmission power to each stream ($l_u$: 0 to $K_u$-1) of each mobile station 4 for which the singular value is obtained through the processing procedure of step S13. For example, when there are two streams in each of the four mobile stations 4, the power distribution coefficient for each stream may be calculated by equally dividing the total transmission power of the base station 1 into eight.

Further, the transmission method determination unit 104 calculates the power distribution coefficients corresponding to each stream in advance for each number of ranks (each number of streams) that can be selected. For example, when the number of streams of a predetermined mobile station 4 for which the singular value is obtained through the processing procedure of step S13 is "4," the transmission method determination unit 104 calculates the power distribution coefficients for selected streams in advance for each of the case of the number of ranks 1, the case of the number of ranks 2, and the case of the number of ranks 3. The "selected streams" indicate streams which are selected by the number of ranks in the descending order of the singular values. For example, in the case where the power distribution coefficient is calculated when the number of streams for which the singular value is obtained is 4, and the number of ranks is 2, it indicates that the power distribution coefficients for the stream with the largest singular value and the stream with the next largest singular value are calculated.

In step S15, the transmission method determination unit 104 calculates an instantaneous reception SNR in each stream of each mobile station 4 (an SNR of a signal received by the mobile station 4. Hereinafter, referred to as an "instantaneous reception SNR") by substituting the power distribution coefficient for each stream ($l_u$: 0 to $K_u$-1) of each mobile station 4 obtained by the processing procedure of step S14 into the following Formula (3). The noise power of Formula (3) is the noise power estimated at the mobile station 4 side. Therefore, the transmission method determination unit 104 acquires the noise power estimated by the estimating unit 203 of the mobile station 4 in advance (causes the mobile station 4 to give feedback).

[Math. 3]

$$\gamma_{u,l_u} = \lambda_{u,l_u} \cdot \alpha_{u,l_u} \cdot \frac{P_{total}}{\sigma^2} \quad \text{Formula (3)}$$

$\gamma_{u,l_u}$ ⋯ instantaneous reception SNR in $l_u$-th stream of mobile station $u$ $\lambda_{u,l_u}$ ⋯ singular value in $l_u$-th stream of mobile station $u$ $\alpha_{u,l_u}$ ⋯ power distribution coefficient in $l_u$-th stream of mobile station $u$ $P_{total}$ ⋯ total transmission power of base station $\sigma^2$ ⋯ noise power In step S16, the transmission method determination unit 104 compares the instantaneous reception SNR calculated by the processing procedure of step S15 with the look-up table and determines the modulation level and the code rate applied to each of the streams of the mobile station 4 for each mobile station 4.

FIG. 11 is a diagram illustrating an example of the look-up table. In the look-up table, the instantaneous reception SNR is associated with the modulation level and the code rate (Modulation and Coding Scheme (MCS)) corresponding to the instantaneous reception. FIG. 11A visually illustrates the look-up table, and FIG. 11B illustrates a specific example of the look-up table. When the instantaneous reception SNR in a specific stream is in a range of "b to c," the transmission method determination unit 104 selects "16QAM" and "2/3" as the modulation level and the code rate to be applied to the stream.

In step S17, the transmission method determination unit 104 determines the number of ranks, the modulation level and the code rate to be applied to each stream of the mobile station 4, and the power distribution coefficient for each mobile station 4. More specifically, when the water filling principle is used in the processing procedure of step S14, the transmission method determination unit 104 uses the power distribution coefficient and number of ranks determined in the processing procedure of step S14 and the modulation level and the code rate to be applied to each stream which is determined in the processing procedure of step S16 as the number of ranks, the modulation level and the code rate to be applied to each stream of the mobile station 4, and the power distribution coefficient which are determined by the processing procedure of step S17.

Further, when the total transmission power is equally distributed to the streams of the mobile stations 4 through the processing procedure of step S14, the transmission method determination unit 104 searches for a combination of the parameters in which the throughput of the entire system is highest and determines the number of ranks, the modulation level of each stream, the code rate of each stream, and distribution of the transmission power of each stream.

For example, in the processing procedure of step S14, the power distribution coefficient is assumed to be calculated in advance for each selected streams for each of the case of the number of ranks 1, the case of the number of ranks 2, the case of the number of ranks 3, and the case of the number of ranks 4. In this case, the transmission method determination unit 104 calculates the throughput in the case of the number of ranks 1, the throughput in the case of number of ranks 2, the throughput in the case of number of ranks 3, and the throughput in the case of number of ranks 4 by calculating the throughputs of the respective streams in each of the case of the number of ranks 1, the case of the number of ranks 2, the case of the number of ranks 3, and the case of the number of ranks 4 and adding the throughputs. The throughput of each stream can be calculated from the modulation level and the code rate selected in the processing procedure of step S16. For example, when 16QAM and the code rate 1/2 are applied, a throughput per symbol can be calculated as 4 bits×½=2 bits. Then, the transmission method determination unit 104 determines the number of ranks with the highest throughput among the throughput in the case of the number of ranks 1, the throughput in the case of the number of ranks 2, the throughput in the case of the number of ranks 3, and the throughput in the case of the number of ranks 4 as the number of ranks to be used for the communication of the mobile station 4. Preferably, for the power distribution coefficient, the modulation level, and the code rate of each stream corresponding to the determined number of ranks, the power distribution coefficient, the modulation level, and the code rate determined in the processing procedures of step S14 and step S16 are used without change. By performing the above procedure for all the mobile stations 4, the number of ranks of each mobile station 4, the modulation level and the code rate to be applied to each stream of the mobile station 4, and the power distribution coefficient can be determined so that the throughput of the entire system is maximum.

After the above processing procedure is completed, the transmission method notifying unit 106 gives a notification of the number of ranks of each mobile station 4 and the modulation level and the code rate to be applied to each stream of the mobile station 4 which are determined by the transmission method determination unit 104 to each mobile station 4.

(Generation and Update of Look-Up Table)

The look-up table stored in the managing unit 105 may be generated in advance using a computer simulation or the like. Further, the managing unit 105 may calculate an estimated throughput by changing the instantaneous reception SNR, the modulation level, and the code rate using the following Formulas (4) and (5) and generate the look-up table based on the calculated estimated throughput. More specifically, for example, the managing unit 105 may generate the look-up table by delimiting the instantaneous reception SNR into predetermined widths in advance and determining the modulation level and the code rate so that an average of the estimated throughput is maximum in a predetermined width range.

[Math. 4]

$$P_e \approx 0.2\exp\left(-1.5\gamma \frac{G_c}{M-1}\right) \quad \text{Formula (4)}$$

$$S_{est} = M \cdot R \cdot \{1 - (1 - P_e)^{N_B}\} \quad \text{Formula (5)}$$

$\gamma$ ⋯ instantaneous reception *SNR*
$M$ ⋯ modulation level
$G_c$ ⋯ coding gain
$R$ ⋯ code rate
$N_B$ ⋯ block size (number of bits in one block)

In Formula (4), the coding gain is a gain which is determined based on a coding algorithm (for example, a turbo code) and the code rate. Since the coding algorithm used in the radio communication system according to the present embodiment is assumed to be determined in advance (fixed), the managing unit 105 uniquely determines the coding gain from the code rate.

Further, an appropriate modulation level or an error correction capability by encoding varies with time due to a variation in the channel information between the base station 1 and the mobile station 4 (a change in a characteristic of a transmission path). Therefore, the managing unit 105 may appropriately update the look-up table which is generated in advance for each mobile station 4. FIG. 12 illustrates an example of updating the look-up table with time.

Any method may be used as a method of updating the look-up table, but for example, the managing unit 105 may update the boundary of the instantaneous reception SNR at which the MCS is switched based on ACK (reception success)/NACK (reception failure) reported from the mobile station 4 through a downward hybrid automatic repeat-request (HARQ) process.

More specifically, when ACK is reported from the mobile station 4 in response to a downlink signal transmitted using the modulation level and the code rate corresponding to an MCS(m) (m=1 to 5 in the example of FIG. 11), the managing unit 105 updates the look-up table so that the value of the instantaneous reception SNR serving as the boundary between an MCS(m−1) and the MCS(m) of the look-up table is decreased. In other words, the managing unit 105 updates the look-up table so that a lower limit of the instantaneous reception SNR to which the MCS(m) is applied is increased.

Similarly, when NACK is reported from the mobile station 4 in response to a downlink signal transmitted using the modulation level and the code rate corresponding to the MCS(m), the managing unit 105 updates the look-up table so that the value of the instantaneous reception SNR serving as the boundary between the MCS(m−1) and the MCS(m) of the look-up table is increased. In other words, the managing unit 105 updates the look-up table so that an upper limit of the instantaneous reception SNR to which the MCS(m−1) indicating the lower modulation level and the lower code rate is applied is increased.

The managing unit 105 may update the look-up table each time ACK/NACK is received or may update the look-up table at intervals of predetermined periods. In the latter case, the managing unit 105 may count the number of ACKs/NACKs received within a predetermined period for each MCS(m), update the look-up table so that the value of the instantaneous reception SNR serving as the boundary between the MCS(m−1) and the MCS(m) of the look-up table is decreased when the number of ACKs received within a predetermined period is large (a predetermined ratio or more), and update the look-up table so that the value of the instantaneous reception SNR serving as the boundary between the MCS(m−1) and the MCS(m) of the look-up table is decreased when the number of ACKs received within a predetermined period is small (less than a predetermined ratio). It is possible to reduce an increase in a processing load which is caused by frequent updating of the look-up table.

The managing unit 105 may increase or decrease a predetermined value for a degree (db) by which the value of the boundary of instantaneous reception SNR between MCSs is increased or decreased or may calculate a value to be increased or decreased using Formula (6). In Formula (6), "$\gamma_{lower,m}$" indicates an increase/decrease value (a value to be increased or decreased) of the instantaneous reception SNR at the boundary between the MCS (m−1) and the MCS(m).

[Math. 5]

$$\gamma_{lower,m}(t)(\text{dB}) = \quad \text{Formula (6)}$$
$$\begin{cases} \beta \cdot (-\Delta) + \\ (1-\beta)\gamma_{lower,m}(t-1) \end{cases} : \text{when } ACK \text{ is reported}$$
$$\begin{cases} \beta \cdot (-\Delta) + \\ (1-\beta)\gamma_{lower,m}(t-1) \end{cases} : \text{when } NACK \text{ is reported}$$

In Formula (6), "t" indicates a timing at which the look-up table is updated, and "t−1" indicates the last update timing. "β" (β is a real number of 0<β<1) is a forgetting factor, and as a value of β increases, influence of the last update decreases. "Δ(dB)" indicates an amount of change in the increase/decrease value of the instantaneous reception SNR. Since there is no increase/decrease value at the time of the last update at the time of initial update, the managing unit 105 may increase or decrease by Δ(dB) without using Formula (6).

CONCLUSION

According to the embodiment, there is provided a base station that supports multi-user MIMO and performs communication with a plurality of mobile stations of a radio communication system including the base station and the plurality of mobile stations, the base station including a determination unit that determines a number of a plurality of streams to be transmitted to each of the plurality of mobile stations and parameters to be applied to each of the plurality of streams to be transmitted to each of the plurality of mobile stations based on a channel estimation value for each of the plurality of mobile stations; and a transmitter that generates a determined number of streams according to the parameters determined by the determination unit to be transmitted to the respective plurality of mobile stations. According to this base station 1, a technique is provided that allows resources used for communication to be adaptively selected in a radio communication system using MU-MIMO.

The parameters may include a code rate, a modulation level, and a power distribution coefficient which are applied to each of the plurality of streams to be transmitted to each of the plurality of mobile stations. As a result, the base station 1 can generate a plurality of streams to be transmitted to the mobile station 4.

The base station may further include a managing unit that manages a table in which a reception SNR is associated with a modulation level and a code rate corresponding to the reception SNR, wherein the determination unit may calculate the reception SNR of each of the plurality of streams to be transmitted to a predetermined mobile station based on the channel estimation value with the predetermined mobile station among the plurality of mobile stations, and may determine the modulation level and the code rate to be applied to each of the plurality of streams to be transmitted to each of the plurality of mobile stations by comparing the calculated reception SNR with the table. As a result, the base station 1 can determine an optimum modulation level and an optimum code rate. Further, the base station 1 can determine the modulation level and the code rate according to the communication state by updating the table.

The determination unit may calculate a pre-coding matrix from the channel estimation value with the predetermined mobile station among the plurality of mobile stations, decompose an orthogonalized channel matrix calculated by multiplying the pre-coding matrix by the channel estimation value into singular values, calculate the power distribution coefficient corresponding to each of the plurality of streams to be transmitted to the predetermined mobile station using the singular value, and calculate the reception SNR in each of the plurality of streams to be transmitted to the predetermined mobile station based on the singular value, the power distribution coefficient, the noise power reported from the mobile station, and total transmission power of the base station. As a result, the base station 1 can calculate various parameters used for communication using the singular value decomposition (SVD).

The determination unit may determine the power distribution coefficient corresponding to each of the plurality of streams to be transmitted to the predetermined mobile station and the number of the plurality of streams to be transmitted to each of the plurality of mobile stations by applying a water filling principle to the singular value. As a result, the base station 1 can distribute the transmission power of each stream so that the system capacity is maximized.

The determination unit may determine the number of streams to be transmitted to each of the plurality of mobile stations and the modulation level and the code rate of each of the plurality of streams by determining the power distribution coefficient corresponding to each of the plurality of streams to be transmitted to each of the plurality of mobile stations by equally distributing the total transmission power in the base station, acquiring the modulation level and the code rate by comparing the reception SNR calculated based on the determined power distribution coefficient with the table, calculating a total throughput obtained by adding throughputs of the plurality of streams to be transmitted to each of the plurality of mobile stations using the throughput calculated from the acquired modulation level and the code rate, and determining the number of streams and the modulation level and the code rate of each of the plurality of streams so that the total throughput in each of the mobile stations may become a maximum. As a result, the base station 1 can determine the modulation level and the code rate of each stream so that the system capacity is maximized when the equal power distribution is performed.

The managing unit may generate the table based on an estimated throughput calculated by substituting the reception SNR, a coding gain, the modulation level, and the code rate into a predetermined calculation formula. As a result, the base station 1 can automatically generate the look-up table.

The managing unit may update, for each mobile station, a correspondence between the reception SNR in the table and the modulation level and the code rate corresponding to the reception SNR based on ACK and NACK in a HARQ process which is reported from the mobile station. As a result, the base station 1 can select an appropriate modulation level and an appropriate code rate according to a propagation state with the mobile station 4 and improve the communication quality.

Supplement of Embodiment

As described above, the configurations of the base station 1 and the mobile station 4 described in the embodiment of the present invention may be implemented such that a program is executed by a CPU (processor) in a device having the CPU and a memory, may be a configuration implemented by hardware such as a hardware circuit equipped with a processing logic described in the present embodiment, or may be a combination of a program and hardware.

The exemplary embodiment of the present invention has been described above, but the disclosed invention is not limited to the above embodiment, and those skilled in the art would understand that various modified examples, revised examples, alternative examples, substitution examples, and the like can be made. In order to facilitate understanding of the invention, specific numerical value examples have been used for description, but the numerical values are merely examples, and certain suitable values may be used unless otherwise stated. The classification of items in the above description is not essential to the present invention, matters described in two or more items may be combined and used as necessary, and a matter described in one item may be applied to a matter described in another item (unless inconsistent). The boundary between functional units or processing units in a functional block diagram does not necessarily correspond to the boundary between physical parts. Operations of a plurality of functional units may be performed physically by one component, or an operation of one functional unit may be performed physically by a plurality of parts. In the sequences and the flowcharts described in the embodiment, the order may be changed as long as there is no inconsistency. For the sake of convenience of description, the base station 1 and mobile station 4 have been described using the functional block diagrams, but such devices may be implemented by hardware, software, or a combination thereof. Software executed by the processor included in the base station 1 according to the embodiment of the present invention and software executed by the processor included in the mobile station 4 according to the embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate storage medium.

Notification of information is not limited the aspect/embodiment described in the present specification any may be performed by other methods. For example, notification of information may be performed via physical layer signaling (for example, Downlink Control Information (DCI) or Uplink Control Information (UCI)), upper-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to Long Term Evolution (LTE), LTE-advanced (LTE-A), SUPER 3G, IMT-Advanced, 4G, 5G, Future Radio Access (FRA), W-CDMA (registered trademark), GSM (registered trademark), CDMA2000, Ultra Mobile Broadband (UMB), IEEE 802.11 (Wi-Fi), IEEE 802.16 (WiMAX), IEEE 802.20, Ultra-Wideband (UWB), Bluetooth (registered trademark), and any other systems using an appropriate system and/or next generation systems extended on the basis of these systems.

Determination or decision may be made by a value (0 or 1) represented by one bit, may be made by a Boolean value (Boolean: true or false), and may be made by comparison of numerical values (comparison with a predetermined value, for example).

Note that the terms described in this specification and/or the terms necessary for understanding of this specification may be replaced with terms having the same or similar meaning. For example, the channel and/or symbol may be signaling (signal). Furthermore, a signal may be a message.

The UE may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or it may also be called by some other suitable terms.

Each aspect/embodiment described in this specification may be used alone, may be used in combination, or may be used while being switched during the execution. Furthermore, notification of predetermined information (e.g., notification of "being X") is not limited to notification that is made explicitly, and the notification may be made implicitly (e.g., notification of the predetermined information is not performed).

The terms "determining" and "deciding" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least".

In addition, processing procedures, sequences, flowcharts, and the like of each embodiment/modified example described in the specification may be exchanged as long as there is no inconsistency. For example, for the methods described in the specification, the elements of the various steps are presented in an exemplary order and are not limited to a specific order presented.

Input and output Information and the like may be stored in a specific location (for example, a memory) and may be managed by a management table. The input and output information and the like may be overwritten, updated, or rewritten. The output information and the like may be erased. The input information and the like may be transmitted to other apparatuses.

Notification of predetermined information (e.g., notification of "being X") is not limited to notification that is made explicitly, and the notification may be made implicitly (e.g., notification of the predetermined information is not performed).

Information, signals, and the like described in the present specification may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

This international patent application is based upon and claims the benefit of priority of Japanese Patent Application No. 2016-048752 filed on Mar. 11, 2016, and the entire contents of Japanese Patent Application No. 2016-048752 are incorporated herein by reference.

LIST OF REFERENCE SYMBOLS 1, 2 base station
3 central control station
4 mobile station
101 signal transmitting unit
102 signal receiving unit
103 acquiring unit
104 transmission method determination unit
105 managing unit 106 transmission method notifying unit
201 signal transmitting unit
202 signal receiving unit
203 estimating unit
204 transmission method acquiring unit
301 RF module
302 BB processing module
303 device control module
304 communication IF
401 RF module
402 BB processing module
403 UE control module

The invention claimed is:

1. A base station that supports multi-user MIMO and performs communication with a plurality of mobile stations of a radio communication system including the base station and the plurality of mobile stations, the base station comprising:
a determination unit that determines a number of a plurality of streams to be transmitted to each of the plurality of mobile stations and a code rate, a modulation level, and a power distribution coefficient to be applied to each of the plurality of streams to be transmitted to each of the plurality of mobile stations based on a channel estimation value for each of the plurality of mobile stations;
a transmitter that generates a determined number of streams according to the code rate, the modulation level, and the power distribution coefficient determined by the determination unit to be transmitted to the respective plurality of mobile stations; and
a managing unit that manages a table in which a reception SNR is associated with a modulation level and a code rate corresponding to the reception SNR,
wherein the determination unit calculates the reception SNR of each of the plurality of streams to be transmitted to a predetermined mobile station based on the channel estimation value with the predetermined mobile station among the plurality of mobile stations, and determines the modulation level and the code rate to be applied to each of the plurality of streams to be transmitted to each of the plurality of mobile stations by comparing the calculated reception SNR with the table, and
wherein the managing unit generates the table based on an estimated throughput calculated by substituting the reception SNR, a coding gain, the modulation level, and the code rate into a predetermined calculation formula.

2. The base station according to claim 1, wherein the determination unit
calculates a pre-coding matrix from the channel estimation value with the predetermined mobile station among the plurality of mobile stations,
decomposes an orthogonalized channel matrix calculated by multiplying the pre-coding matrix by the channel estimation value into singular values,
calculates the power distribution coefficient corresponding to each of the plurality of streams to be transmitted to the predetermined mobile station using the singular value, and
calculates the reception SNR in each of the plurality of streams to be transmitted to the predetermined mobile station based on the singular value, the power distribution coefficient, the noise power reported from the mobile station, and total transmission power of the base station.

3. The base station according to claim 2, wherein the determination unit determines the power distribution coefficient corresponding to each of the plurality of streams to be transmitted to the predetermined mobile station and the number of the plurality of streams to be transmitted to each of the plurality of mobile stations by applying a water filling principle to the singular value.

4. The base station according to claim 2, wherein the determination unit determines the number of streams to be transmitted to each of the plurality of mobile stations and the modulation level and the code rate of each of the plurality of streams by
determining the power distribution coefficient corresponding to each of the plurality of streams to be transmitted to each of the plurality of mobile stations by equally distributing the total transmission power in the base station,
acquiring the modulation level and the code rate by comparing the reception SNR calculated based on the determined power distribution coefficient with the table,
calculating a total throughput obtained by adding throughputs of the plurality of streams to be transmitted to each of the plurality of mobile stations using the throughput calculated from the acquired modulation level and the code rate, and
determining the number of streams and the modulation level and the code rate of each of the plurality of streams so that the total throughput in each of the mobile stations becomes a maximum.

5. The base station according to claim 1, wherein the managing unit updates, for each mobile station, a correspondence between the reception SNR in the table and the modulation level and the code rate corresponding to the reception SNR based on ACK and NACK in a HARQ process which is reported from the mobile station.

* * * * *